(12) United States Patent
Lause

(10) Patent No.: US 6,612,340 B1
(45) Date of Patent: Sep. 2, 2003

(54) TURNBACK PROTECTION FOR INSTALLATION OF CURED IN PLACE LINERS

(75) Inventor: John Patrick Lause, Ballwin, MO (US)

(73) Assignee: Insituform (Netherlands) B.V. (NL)

( * ) Notice: Subject to any disclaimer, the term of this patent is extended or adjusted under 35 U.S.C. 154(b) by 321 days.

(21) Appl. No.: 09/608,912

(22) Filed: Jun. 30, 2000

(51) Int. Cl.[7] ................................................ F16L 55/16
(52) U.S. Cl. ........................ 138/98; 138/97; 405/184.1
(58) Field of Search .................. 138/97, 98; 405/184.1, 405/184.2

(56) References Cited

U.S. PATENT DOCUMENTS

| | | | |
|---|---|---|---|
| 4,009,063 A | | 2/1977 | Wood |
| 4,064,211 A | | 12/1977 | Wood |
| 4,135,958 A | | 1/1979 | Wood |
| 4,581,085 A | | 4/1986 | Wood |
| 4,686,126 A | * | 8/1987 | Hyodo et al. ................. 138/97 |
| 5,044,405 A | | 9/1991 | Driver et al. |
| 5,186,987 A | * | 2/1993 | Imoto et al. ................... 138/98 |
| 5,334,429 A | * | 8/1994 | Imoto et al. ................... 138/98 |
| 5,348,801 A | * | 9/1994 | Venzi et al. ................... 138/97 |
| 5,765,597 A | * | 6/1998 | Kiest, Jr. et al. .............. 138/98 |
| 5,780,123 A | * | 7/1998 | Kamiyama et al. ........... 138/98 |
| 5,794,663 A | * | 8/1998 | Kiest, Jr. et al. .............. 138/98 |
| 6,117,507 A | * | 9/2000 | Smith ........................... 138/97 |
| 6,146,491 A | * | 11/2000 | Wood et al. .................... 138/97 |
| 6,374,862 B1 | * | 4/2002 | Schwert ........................ 138/98 |

* cited by examiner

*Primary Examiner*—James Hook
(74) *Attorney, Agent, or Firm*—Michael I. Wolfson; Reed Smith LLP

(57) ABSTRACT

Fusion of facing portions of the turnback portion of an installed everted resin impregnated cured in place liner installed in an existing conduit is avoided by adhering a high temperature turnback release film to a portion of the trailing end of the everting liner. After cure and removal of the downstream end of the liner, the high temperature release film is peeled away from the cured liner. This avoids the need to remove the fused portion of the turnback by cutting or excavation of a section of the liner. Fusion generally occurs due to the exotherm from the crosslinking of the thermosetting resin impregnated into the flexible lining.

18 Claims, 6 Drawing Sheets

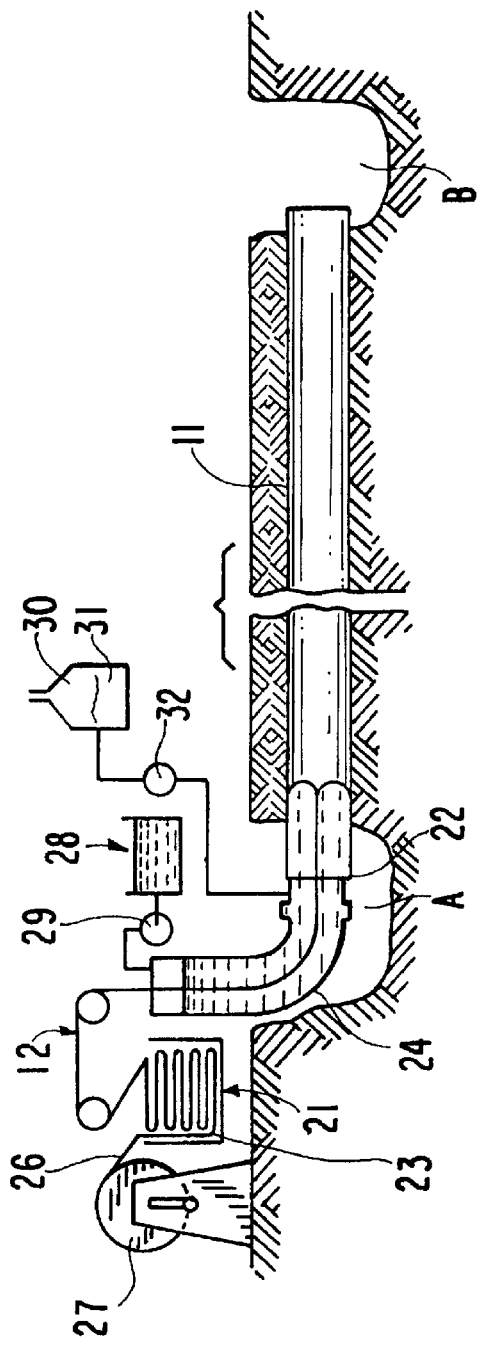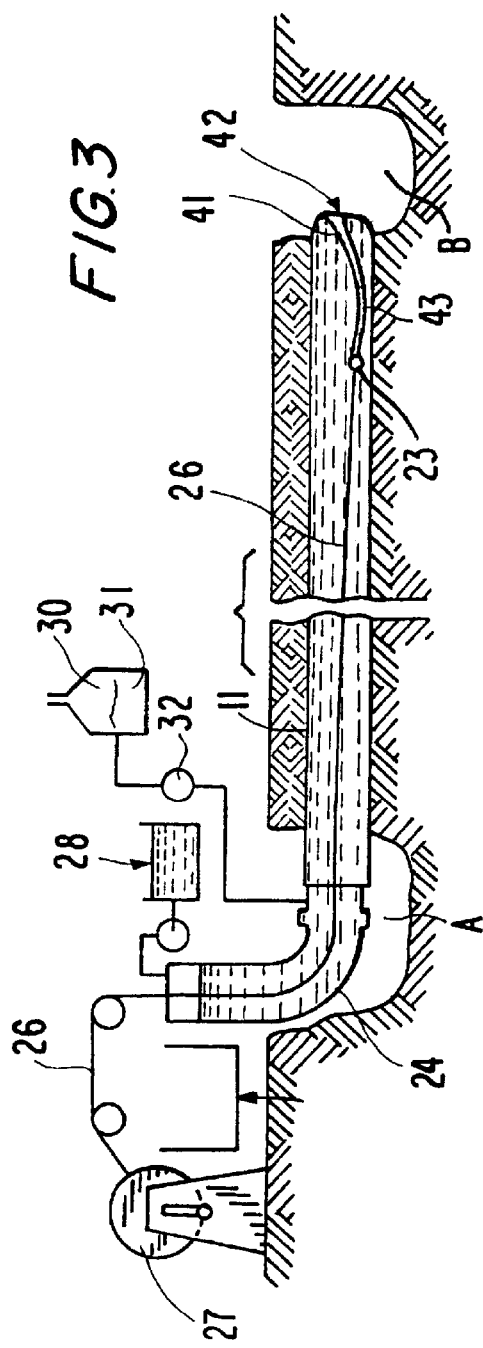

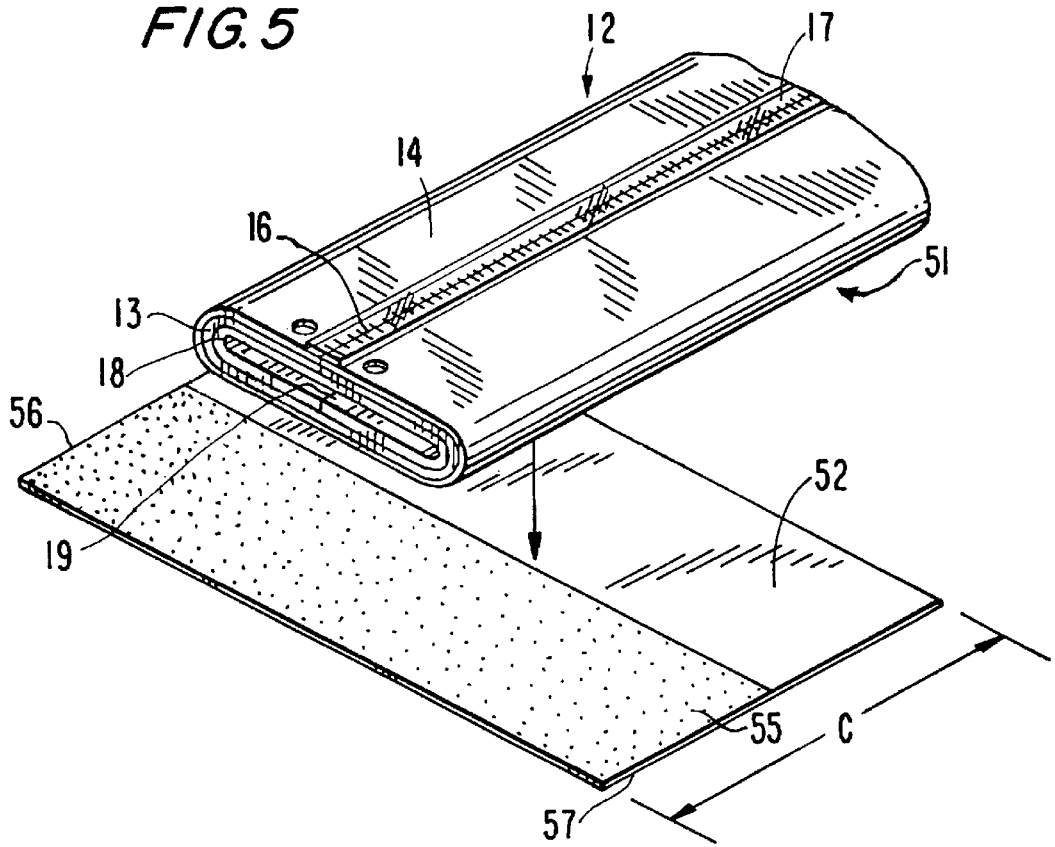
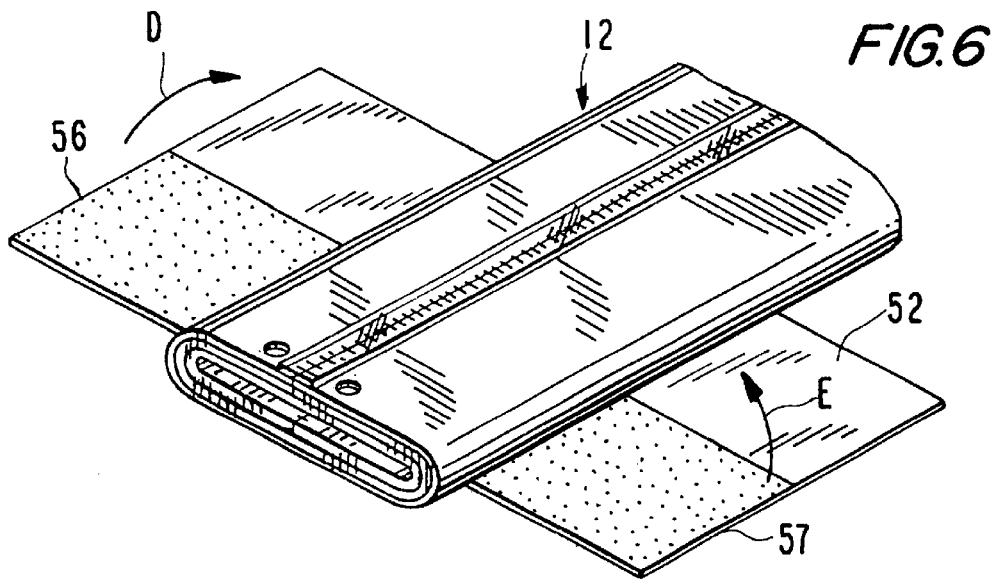

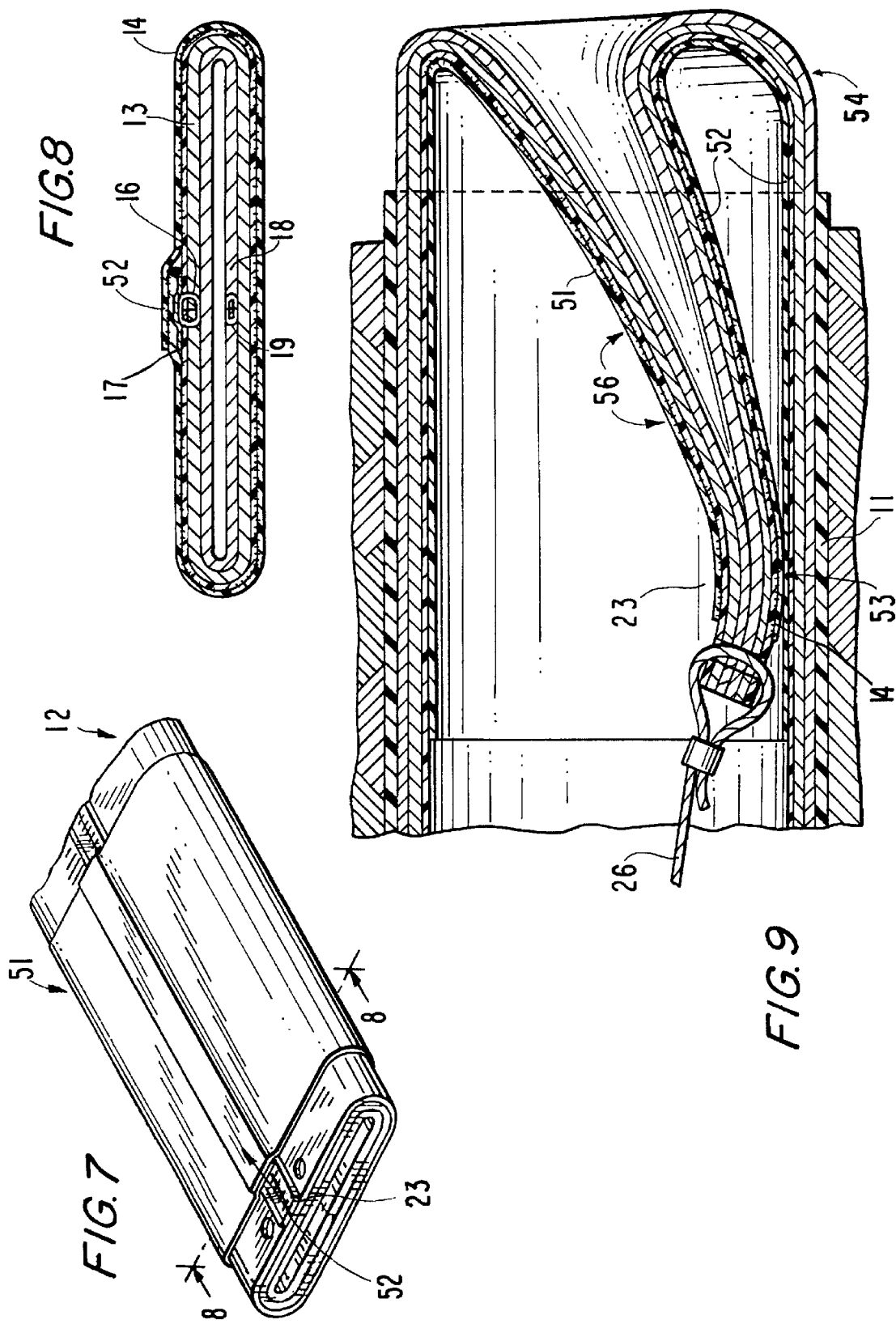

TURNBACK PROTECTION FOR INSTALLATION OF CURED IN PLACE LINERS

BACKGROUND OF THE INVENTION

This invention relates to a method for installation of a cured in place liner into an existing conduit by everting the liner, and more particularly to a method for preventing the portion of the liner which turns back during eversion from bonding to the inner wall of the liner as it is cured, and to the liner assembly including a turnback release protection film.

It is generally well known that conduits or pipelines, particularly underground pipes, such as sanitary sewer pipes, storm sewer pipes, water lines and gas lines that are employed for conducting fluids frequently require repair due to fluid leakage. The leakage may be inward from the environment into the interior or conducting portion of the pipe. Alternatively, the leakage may be outward from the conducting portion of the pipe into the surrounding environment. In either case, it is desirable to avoid this leakage.

The leakage may be due to improper installation of the original pipe, or deterioration of the pipe itself due to normal aging or to the effects of conveying corrosive or abrasive material. Cracks at or near pipe joints may be due to environmental conditions such as earthquakes or the movement of large vehicles or similar natural or man made vibrations, or other such causes. Regardless of the cause, such leakages are undesirable and may result in waste of the fluid being conveyed within the pipeline, or result in damage to the surrounding environment and in a possible creation of a dangerous public health hazard.

Because of ever increasing labor and machinery costs, it is increasingly more difficult and less economical to dig up and replace underground pipes or portions that may be leaking. As a result, various methods had been devised for the in place repair or rehabilitation of the existing pipelines. This avoids the expense and hazard associated with digging up and replacing the pipes or pipe sections. One of the most successful pipeline repair or trenchless rehabilitation processes that is currently in wide use is called the Insituform® Process and is described in U.S. Pat. Nos. 4,009,063, 4,064,211 and 4,135,958, the contents of all of which are incorporated herein by reference.

In the Insituform Process an elongated flexible tubular liner of a felt fabric, foam or similar resin impregnable material that has been impregnated with a thermosetting curable resin is installed within the existing pipeline. The impregnated liner may be pulled into the conduit by a rope or cable and a fluid impermeable inflation bladder or tube is then everted within the liner. Generally, the liner is installed utilizing an everting process, as described in the later two identified Insituform patents.

The flexible tubular liners has a smooth layer of relatively flexible, substantially impermeable polymer coating the outside of the liner in its initial state. This impermeable layer ends up on the inside of the liner after the liner is everted during installation. As the flexible liner is installed in place within the pipeline, the pipeline is pressurized from within, preferably utilizing a fluid such as water which forces the liner radially outwardly to engage and conform to the interior surface of the existing pipeline. The resin which has been impregnated to the impregnable material is then cured to form a hard, tight fitting rigid pipe lining within the existing pipeline. The new liner effectively seals any cracks and that repairs any pipe section or pipe joint deterioration in order to prevent further leakage either into or out of the pipeline. The cured resin also serves to strengthen the existing pipeline wall so as to provide added structural support for the surrounding environment.

Generally, in the Insituform® Process, the resin impregnated liner is flat and is typically stored in layers. It is transported to a manhole adjacent to the pipeline to be lined. The leading end of the liner is sealingly clamped to the distal end of an eversion tube in order to create a fluid seal. Pressurized fluid, such as water then forces the liner to evert into the pipeline. Various means have been provided for controlling the rate in which the liner everts as it is fed into the pipeline. Typical means within the Insituform Process for controlling the feed rate of the liner is by retaining the trailing end of the resin impregnated liner as it is everted into the pipeline using a cable or hold-back rope. By restraining the trailing uneverted end of the liner, the liner does not evert too quickly, thereby ensuring that the pressure against the line is maintained throughout the everting liner.

When the liner is everted under a head of water, the liner stretches to an undeterminable length due to many different variables. This includes, but it is not limited to the inherent properties of the flexible lining material, the pressure of the everting fluid, the slope of the existing pipeline, the effects of different individuals installing the lining and the environment and condition of the existing pipeline. This requires that the installer provide a liner at least the length of the pipeline to be lined that almost always results in some portion of liner that turns-back at completion of installation.

This is the portion of the tube held by the hold-back rope remaining inside of the new cured in place lining and is identified as the "turnback" portion. When turnback occurs during eversion and hot water is circulated through the everted liner to initiate the cure, the turnback portion of the lining comes into contact with the surface wall of the liner as it is being cured. In other words, during the cure cycle of the cured in place pipe installation, the impermeable polymer coating of the turnback portion comes into direct contact with the impermeable coating of the liner against the host pipe wall. The heat from the exotherm of the resin causes the impermeable layers to melt, since the temperature exceeds the melting point of the coating thereby causing the two surfaces to fuse together. After cooling the cured liner, the fused portion of the turnback portion and the lining become one.

When the cure is completed, the end of the everted resin impregnated liner extends into the downstream manhole, the remaining turnback portion of lining inside of the new cured in place liner is usually removed. The difficulty is that the remaining turnback portion of the lining tube is now fused to the lining wall. This requires a substantial amount of resources, in time and dollars to remove the remainder of the tube from inside the cured liner. This is a costly operation, especially in large diameter pipe which can be as large as 8 feet in diameter or greater. Even more critical here is that when the diameter is too small for man entry, the turnback portion now fused to the liner wall must be cut from the manhole. When access is not possible in extreme situations, the entire section of pipe must be dug up and replaced resulting in extremely prohibitive costs.

It is also difficult to resolve this problem where the turnback occurs at a bend near the end of a host pipe. Similarly, at a bend the impermeable layer comes into contact with each other and there is the possibility that the two surfaces will fuse together. Again, this can be very difficult to remove, especially if it is not possible for human entry.

Accordingly, it is highly desirable to eliminate occurrence of fusion of the thermoplastic impermeable layers of a flexible cured in place liner during the cure after eversion of the liner.

SUMMARY OF THE INVENTION

Generally speaking, in accordance with the invention, a method for eliminating the fusion of the thermoplastic impermeable surfaces of a cured in place liner during installation by eversion is provided. Fusion of the turnback portion to the lining surface is avoided by temporarily bonding a high temperature release barrier between the two facing surfaces. The film is a high melt temperature film which is applied to the trailing end of the liner by a self-tack adhesive formulated to bond to the impermeable layer and that is water insoluble. After the installed liner is cured, the end of the everted liner is removed and the remaining high temperature film removed by peeling from the upstream end of the film.

The turnback protection film is applied to the trailing end of the liner in a length equal to from about 1 to up to 5% or more of the total length of the liner. A compatible spray adhesive is applied to about one-third of the release film length at the side of the trailing end of the liner and folded over to encompass the liner completely to form a turnback liner assembly. The turnback liner assembly is then everted into the existing pipeline in the usual manner using an everting fluid. After cure of the resin, the end of the liner extending to the down stream manhole is cut and the turnback protection film remaining within the lined conduit is peeled from the lining and removed.

Accordingly, it is an object of the invention to provide an improved method for eversion of a cured in place liner in an existing conduit.

It is another object of the invention to provide an improved method for preventing turnback fusion between the thermoplastic layer of the turnback portion and the lining after eversion of a cured in place liner in an existing conduit.

It is a further object of the invention to provide an improved liner assembly having a high temperature turnback protection film releasably secured about the trailing end of the liner for preventing turnback fusion after eversion of a cured in place liner.

Still other objects and advantages of the invention will in part be obvious and in part be apparent from the specification.

The invention accordingly comprises the several steps and the relation of one or more of such steps with respect to each of the others, and the article possessing the features, properties, and the relation of elements which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings in which:

FIG. 2 is a cross-sectional elevational schematic view showing a cured-in-place liner at the start of eversion into an underground conduit using a hold-back rope to control the feed rate of the everting liner;

FIG. 3 is a view of the installation of FIG. 1 at the end of eversion;

FIG. 5 is an exploded view of a turnback release film being adhered to the trailing end of a cured in place liner in accordance with the invention;

FIG. 6 illustrates how the turnback protection film of FIG. 4 is adhered to the liner in accordance with the invention;

FIG. 7 is a perspective view of a turnback release film liner assembly constructed and arranged in accordance with the invention;.

FIG. 8 is a cross-section of liner assembly of FIG. 7 taken along line 8—8;

FIG. 9 is a cross-sectional view similar to FIG. 4 showing the leading end of the everted liner using the assembly of FIGS. 7 and 8.

DESCRIPTION OF THE PREFERRED EMBODIMENTS

Referring to FIG. 2, when an existing pipeline or conduit 11 is not sound, it is desirable to use one of the accepted rehabilitation methods, such as a cured in place flexible liner 12 of the type disclosed in U.S. Pat. Nos. 4,009,063 and 4,064,211. In the eversion process described in the '211 Patent radial pressure applied to the interior of liner 12 to presses it out into engagement with the inner surface of pipeline 11.

Figure 1:
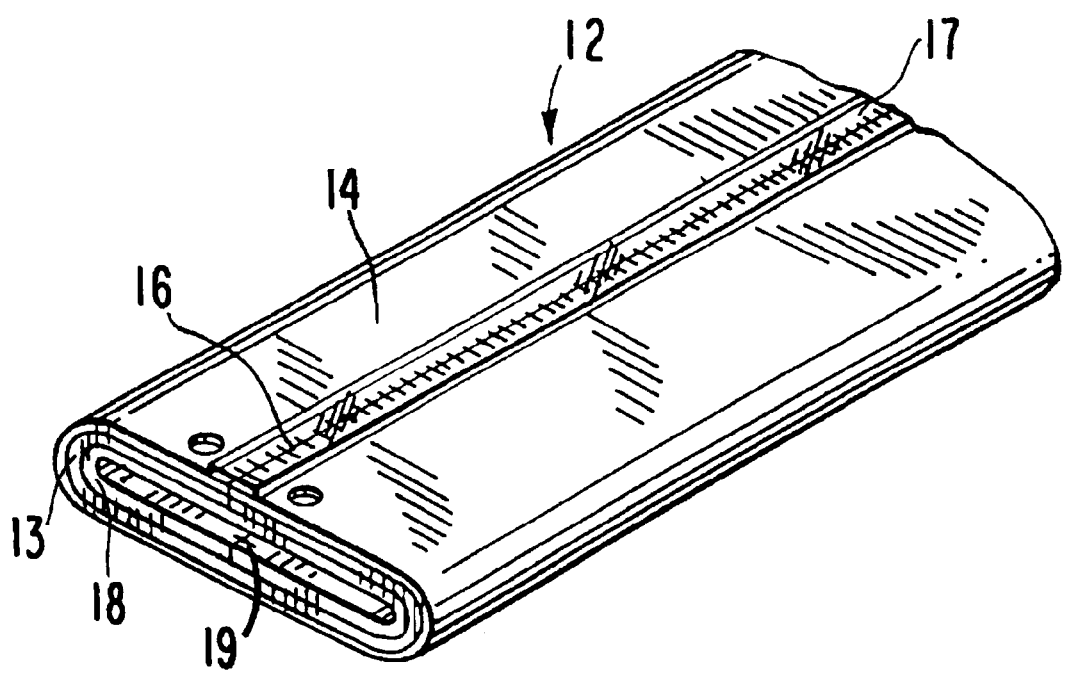
FIG. 1 is a perspective view from the trailing end of a typical resin impregnable cure in placer liner suitable for use in accordance with the invention.

Cured in place liner 12 shown in FIGS. 1 and 5 is formed from at least one layer of a flexible resin impregnable material such as a felt layer 13 having an outer impermeable polymer film layer 14. Felt layer 13 and film layer 14 are stitched along a seam line 16 to form a tubular liner. A compatible thermoplastic film in a form of a tape or extruded material 17 is placed or extruded over seam line 16 in order to ensure impermeability of liner 12 to be everted. In the embodiment illustrated in FIG. 5 and used throughout this description, liner 12 includes an inner second felt layer 18 also seamed along a stitch line 19 which is positioned at a point other than the location of seam line 16 in outer felt layer 13. For larger diameter liners, several layers of felt material may be used. Felt layers 13 and 18 may be natural or synthetic flexible resin absorbable material, such as polyester or acrylic fibers. Impermeable film 14 may be polyolefin, such as polyethylene or polypropylene, or a polyurethane as is well known in the art.

Prior to installation pursuant to the method illustrated in FIGS. 2 and 3, a curable thermosetting resin is impregnated into felt layers 13 and 18 pursuant to a process generally known as "wet-out". The wet-out process generally involves injecting resin into the liner, drawing a vacuum and passing the impregnated liner through nip rollers and is well known in the lining art. One such procedure is described in Insituform U.S. Pat. No. 4,366,012, the contents of which are incorporated herein by reference.

Once liner 12 has been wet-out, it is generally stored in a folded layered condition 21 in preparation for eversion into pipeline 11 from an upstream. Liner 12 has a leading end 22 and a trailing end 23. The eversion may be accomplished by feeding leading end 22 through a down tube 24 with leading end 22 turned over and secured to the outlet end of down tube 24. A hold-back rope 26 is secured to trailing end 23 so that once the full length of liner 12 has passed through down-tube 24 the speed of liner 12 can be controlled by control of hold-back rope 26 by means of any type of release device, such as a winch 27.

Referring to FIG. 2, leading end 22 is secured to down-tube 24. An everting fluid, such as water 28 is fed into down-tube 24 by a first water pump 29. As in FIG. 2, water pressure in liner 12 causes it to evert into pipeline 11 exhausting the supply of liner 12. When conduit 11 is fully lined with liner 12 hold-back rope 26 is secured. Referring now to FIG. 3, a boiler 30 provides a supply of hot water 31 to be circulated through liner 12 through a hot water pump 32. This causes the resin in liner 12 to crosslink, thereby forming a substantially rigid liner within existing conduit 11.

As shown in FIG. 3, everting face 42 of liner 12 extends into manhole B and is cured in that manner. Trailing end 23 of liner 12 forms a turnback portion 41 which remains within newly lined pipeline 11 and liner 12. This is shown in more detail in FIG. 4.

Figure 4:
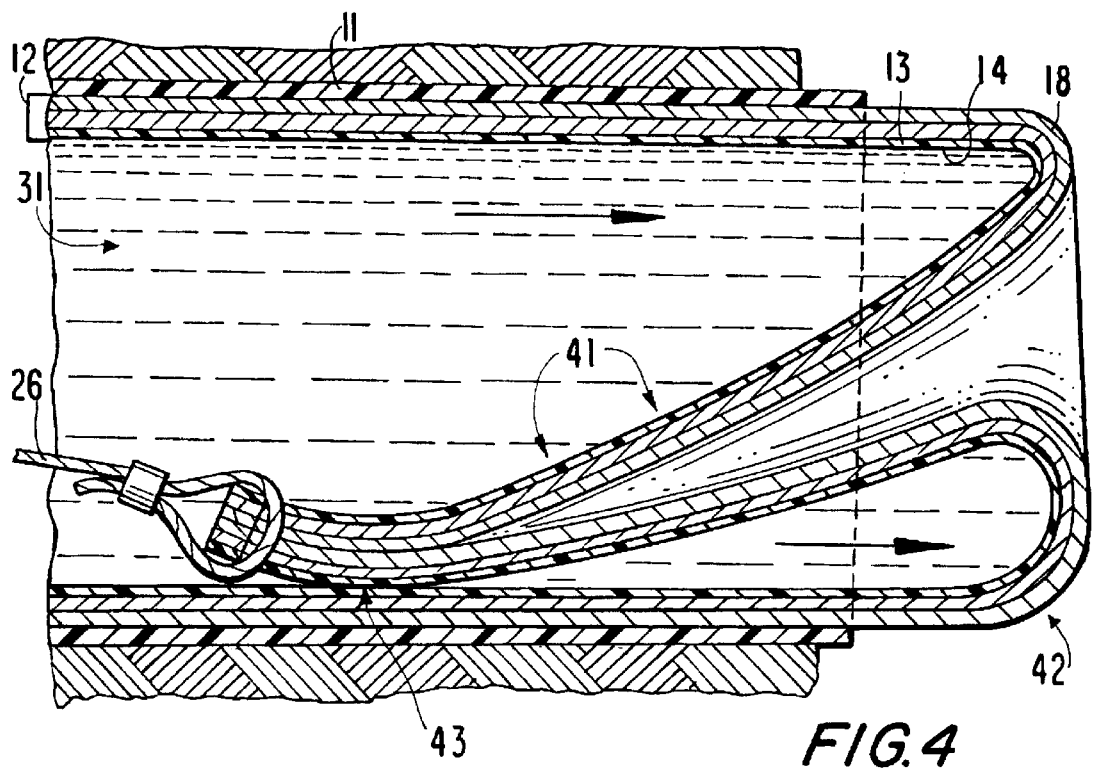
FIG. 4 is a expanded cross-sectional view of the distal end of the eversion showing the turnback portion of the liner of FIGS. 1, 2 and 3 showing turnback fusion occurring.
Figure 4A:
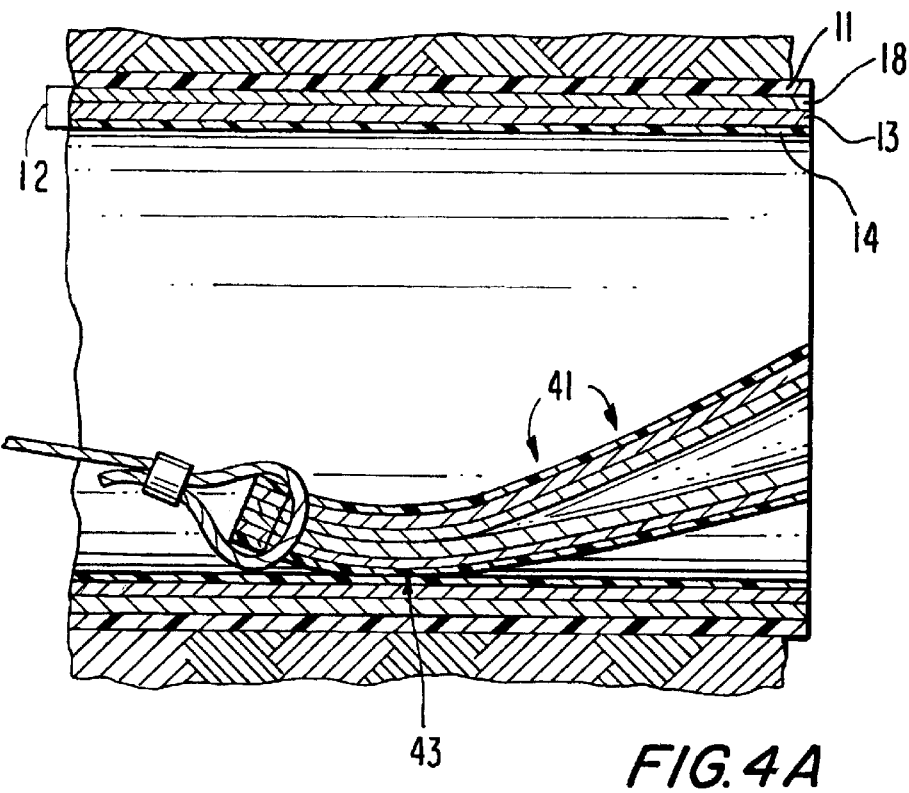
FIG. 4A is identical to FIG. 4 after removal of the distal end of cured liner extending in the downstream manhole.

In FIG. 4, turnback portion 41 is shown resting at the base of everted liner 12 in conduit 11 with everting face portion 42 extending into manhole B. After the resin has cured, liner portion 42 extending to manhole B is removed as shown in FIG. 4A. At this point, turnback portion 41 remains in everted liner 12 with two sections of polymer coating 14 having fused together at a turnback fusion point 43. Fusion occurs at turnback fusion point 43 because of the exotherm created during the crosslinking reaction of resin within felt layers 13 and 18. This exotherm can cause temperatures of between about 250° F. to 400° F. or greater depending on various factors mentioned above. Thus, when impermeable layer 14 is a polyolefin, temperatures in excess of about 200° F. can cause fusion. When layer 14 is polyurethane the melting range is from about 330 to 365° F. so that fusion may occur less frequently than with polyolefin.

Fused turnback portion 43 which remains within everted liner 12 must be physically removed by hand after everting face portion 42 in manhole B is removed. In order to avoid formation of turnback fusion portion 43, a turnback release liner assembly 51 illustrated in FIG. 7 in accordance with the invention is applied to liner 12 prior to eversion.

Assembly 51 is assembled by adhering an adhesive 55 to at least about one-third, preferably one-half the desired length C of turnback release film 52 as shown in FIG. 5. In FIG. 6, liner 12 is then positioned onto release film 52 and a first end 56 of release film 52 is folded over liner 12 in arrow direction D and then opposed end 57 is folded in arrow direction E to form assembly 51 as shown perspective in FIG. 7 and in cross-section in FIG. 8.

FIG. 7 turnback release assembly 51 includes a liner identical to liner 12 and having a high temperature turnback release film 52 partially adhered to trailing end 23 of liner 12. With turnback release film 52 in place, fusion at turnback fusion point 43 is avoided as illustrated in FIG. 9. Installed liner assembly 51 has been installed in the identical fashion as described with respect to FIGS. 2–4, except that now turnback release film 52 at trailing end 23 contacts itself at a turnback point 53. In view of the high temperature characteristics of release film 52 fusion of outer impermeable polymer layer 14 as occurred in the showing in FIGS. 4 and 5 is avoided.

FIG. 8 illustrates turnback release assembly 51 in cross-section through lines 8—8 of FIG. 7. As can be seen, the construction of liner portion 12 is identical to that shown and described with respect to FIG. 4 except for the positioning of the turnback release film 52 at trailing end 23.

After eversion of assembly 51, an everting face 54 of assembly 51 extends into manhole B and is removed in the same fashion described with respect to FIG. 4A. A turnback section 56 can be removed by simply pulling on turnback section 56, since fusion between the facing surfaces of release film 52 does not occur.

Turnback release film 52 is an ultra high temperature film which is interposed between the two facing surfaces of polymer layer 14 at turnback portion. The materials selected for film 52 should have a melting point in the range of at least about 400° F. and be adhesively bondable to impermeable coating 14. Preferably film 52 is a high-temperature fluorocarbon film having a maximum use temperature of about 650° F. (343° C.). Many such fluorocarbon films are commercially available.

The adhesive is preferably a fast tack spray adhesive formulated to bond polyurethane, polyethylene, polypropylene or any other polymer suitable for use as impermeable layer 14 to itself and be water insoluble. Suitable adhesives for use with polyolefins are typically formulated of synthetic resin and styrene butadiene copolymer mixtures in an alaphatic and keytone solvent. Such adhesives are available commercially.

Figure 10:
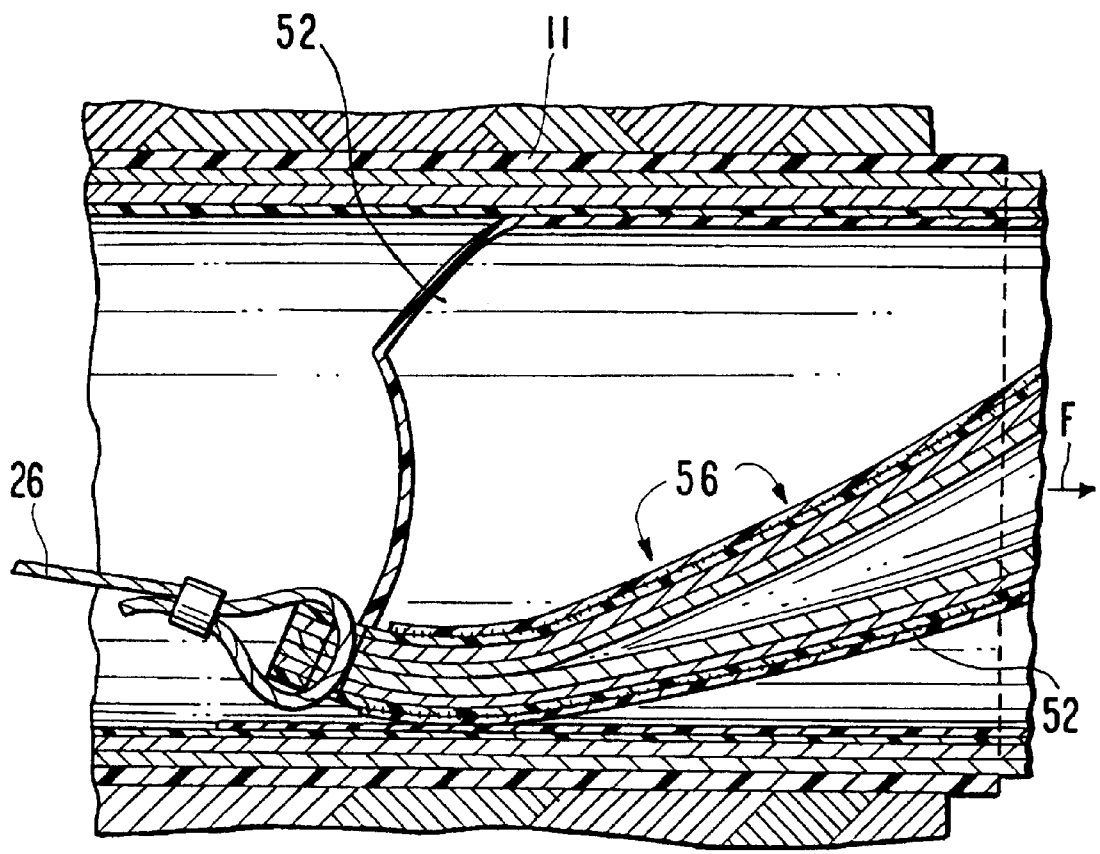
FIG. 10 is a cross-sectional view of the eversion liner of FIG. 9 with the everting face removed.

The length of the turnback release film applied to the trailing end of a liner may vary widely. Typically, between about 1 to 5% of the length of the tube being installed can be used, and preferably between 1.5 to 3.5% of the length. In special applications, the length may be longer. Adhesive is placed on at least about one-third of the length of the release film for smaller size diameters such as 24 inches and less. In this manner, when the liner assembly is installed and everting end removed the upstream most end portion of the release film will not be bonded and will allow for ready removal of the bonded portion once the end of the installed liner has been cut in the B manhole. This is done by pulling release film 52 in the direction of arrow F in FIG. 10.

In FIGS. 5 and 6, adhesive 55 is shown being applied to about one-half the length C of turnback film 52. For installation in larger diameter pipelines, such as diameters larger than 24 inches, adhesive may be applied to the full surface of the release film. This is due to the fact that once such larger diameters are cut, it is possible for the worker in the manhole performing the cut to reach into the lined conduit and peel off the release film adhered to the cured liner.

It will thus be seen that the objects set forth above, among those made apparent from the preceding description, are efficiently attained and, since certain changes may be made and carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed is:

1. A lining assembly having a leading end and a trailing end for an eversion installation into an existing pipeline or conduit whereby the trailing end becomes a turnback portion with facing surfaces during eversion, comprising:

a length of a tubular flexible resin impregnable liner having at least one resin absorbent layer and an outer impermeable layer disposed thereon, and a high temperature release film temporarily adhesively bonded to the trailing end of the lining covering a distance at least the length of the facing surfaces of the turnback portion formed during eversion.

2. The lining assembly of claim 1, wherein the high temperature release film is adhered to the impermeable layer of the tubular lining by a fast tack adhesive.

3. The lining assembly of claim 1, wherein the impermeable layer is a polyolefin.

4. The lining assembly of claim 3, wherein the polyolefin is polyethylene.

5. The lining assembly of claim 3, wherein the polyolefin is polypropylene.

6. The lining assembly of claim 3, wherein the adhesive is formulated of a synthetic resin and styrene butadiene copolymer mixture in an organic solvent.

7. The lining assembly of claim 1, wherein the impermeable layer is polyurethane.

8. The lining assembly of claim 1, wherein the resin impregnable material is a felt.

9. The lining assembly of claim 8, wherein the felt is a polyester felt.

10. The lining assembly of claim 1, wherein the high temperature release film is a fluorocarbon film.

11. The lining of claim 1, wherein the high temperature release film is disposed over at least about 1% of the length of the lining.

12. The lining of claim 11, wherein a fast tack spray adhesive is applied to at least about one-third of the length of the release film at the end of the lining.

13. The lining of claim 1, wherein a fast tack adhesive is applied to at least about one-third of the length of the release film at the end of the lining.

14. A method of fabricating a flexible lining assembly for installation into an existing conduit by eversion, comprising:

providing a tubular flexible lining of at least one layer of resin absorbent material having an outer impregnable layer disposed thereon, flattening the tubular liner, and adhering a high temperature release film about a desired length at one end of the lining with the film overlapping itself.

15. The method of claim 14, wherein the release film is adhered to the lining by applying adhesive on at least about one-third of the length of the film, placing the flattened liner against the adhesive and remainder of the release film, folding one side over the upper surface of the lining and folding the opposed side of the release film over the lining tube to overlap the folded first side of the release film.

16. The method of claim 15, wherein the adhesive is applied to the full exposed surface of the release film prior to applying to the end of the tubular lining.

17. A method of installation of a resin impregnated cured in place lining for installation into an existing conduit from a first access point to a second access point by eversion to form a turnback portion in the everting lining, comprising:

providing a lining assembly of a tubular length of resin impregnable material having an impermeable outer layer, the lining having a leading end and a trailing end and impregnated with a curable resin, and a high temperature release film temporarily adhesively bonded to the trailing end of the length of lining over the impermeable layer and covering a distance of at least the length of the facing surfaces of the turnback portion formed during eversion, securing the leading end of the lining at the first access opening and everting the lining into the existing conduit to extend into the second access location with an everting fluid, and curing the resin in the everted liner, removing the everting end of the lining and a portion of the release film adhering thereto that extends into the second access point.

18. The method of claim 17, including the step of removing the turnback portion of the lining and release film remaining in the end of lined conduit at the second access.

* * * * *